US 6,690,770 B2

(12) United States Patent
Brandt

(10) Patent No.: US 6,690,770 B2
(45) Date of Patent: Feb. 10, 2004

(54) TTY ENHANCEMENT OF BUSY CONDITION PROMPT

(75) Inventor: Jeffrey L. Brandt, Cedar Park, TX (US)

(73) Assignee: SBC Technology Resources, Inc., Austin, TX (US)

( * ) Notice: Subject to any disclaimer, the term of this patent is extended or adjusted under 35 U.S.C. 154(b) by 180 days.

(21) Appl. No.: 10/007,645

(22) Filed: Nov. 8, 2001

(65) Prior Publication Data

US 2003/0086540 A1 May 8, 2003

(51) Int. Cl.[7] .............................................. H04M 11/00
(52) U.S. Cl. ....................................... 379/52; 379/93.17
(58) Field of Search ................................ 379/52, 93.17, 379/93.19, 93.21, 93.23, 93.25, 93.14, 372, 377, 209.01, 210.01, 207.04, 207.05

(56) References Cited

U.S. PATENT DOCUMENTS

| | | |
|---|---|---|
| 5,253,285 A | 10/1993 | Alheim |
| 5,450,470 A | 9/1995 | Alheim |
| 5,463,665 A | 10/1995 | Millios et al. |
| 5,481,589 A | 1/1996 | Morduch |
| 5,680,443 A * | 10/1997 | Kasday et al. ................. 379/52 |
| 5,687,222 A | 11/1997 | McLaughlin et al. |
| 5,712,901 A | 1/1998 | Meermans |
| 5,774,857 A | 6/1998 | Newlin |
| 5,787,148 A | 7/1998 | August |
| 5,905,476 A | 5/1999 | McLaughlin et al. |
| 5,943,395 A | 8/1999 | Hansen |
| 6,002,749 A | 12/1999 | Hansen et al. |
| 6,078,650 A | 6/2000 | Hansen |
| 6,181,736 B1 | 1/2001 | McLaughlin et al. |
| 6,307,921 B1 * | 10/2001 | Engelke et al. ................ 379/52 |

FOREIGN PATENT DOCUMENTS

WO    WO9740612    10/1997

* cited by examiner

*Primary Examiner*—Stella Woo
(74) *Attorney, Agent, or Firm*—Brinks Hofer Gilson & Lione

(57) ABSTRACT

A method and system are disclosed for providing an indication of the busy condition to a calling party on a telecommunications system. The calling party may be the user of a text telephone device such as a TTY device. When a called party's line is busy, the method and system send a text message to the calling party that indicates that the called party's line is busy.

20 Claims, 5 Drawing Sheets

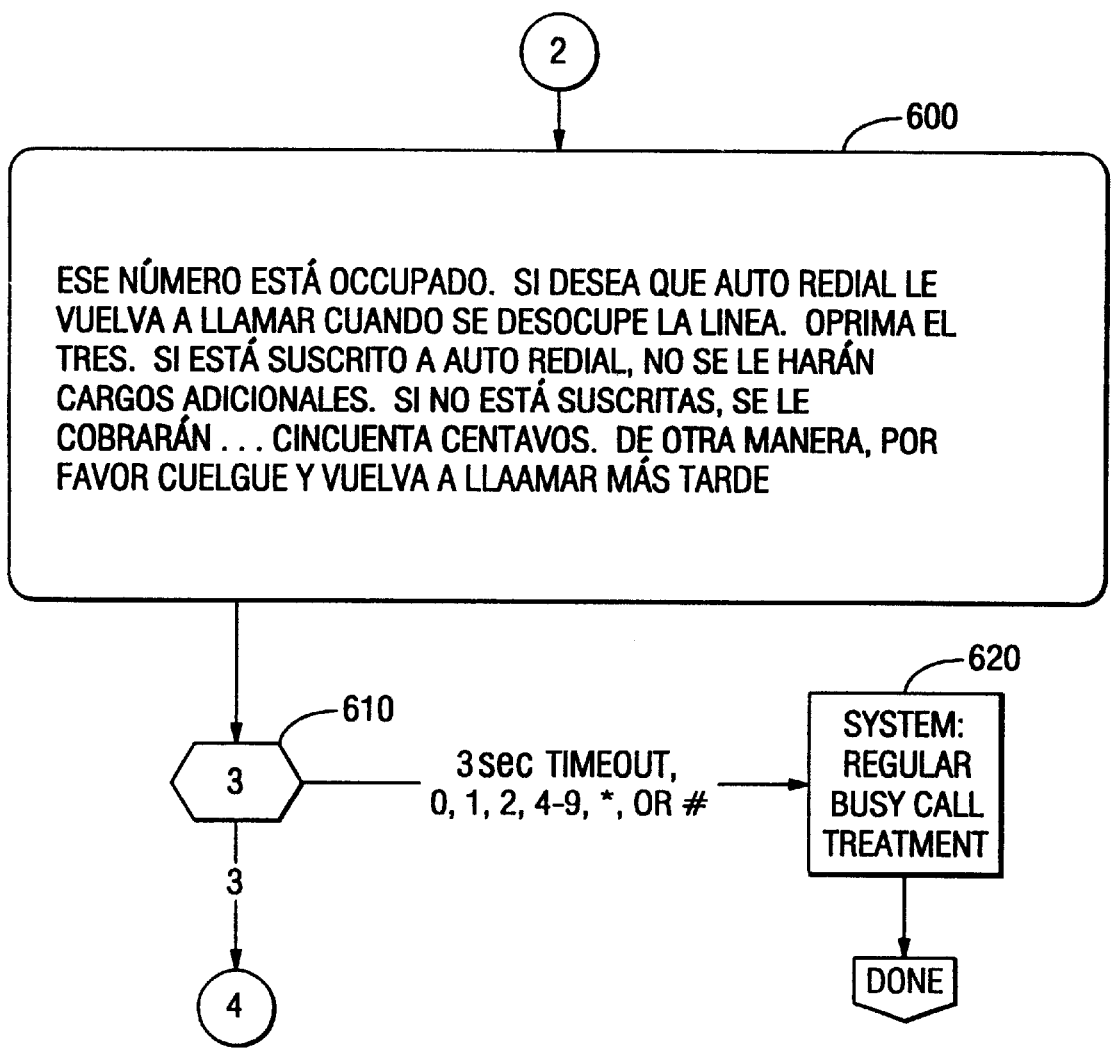

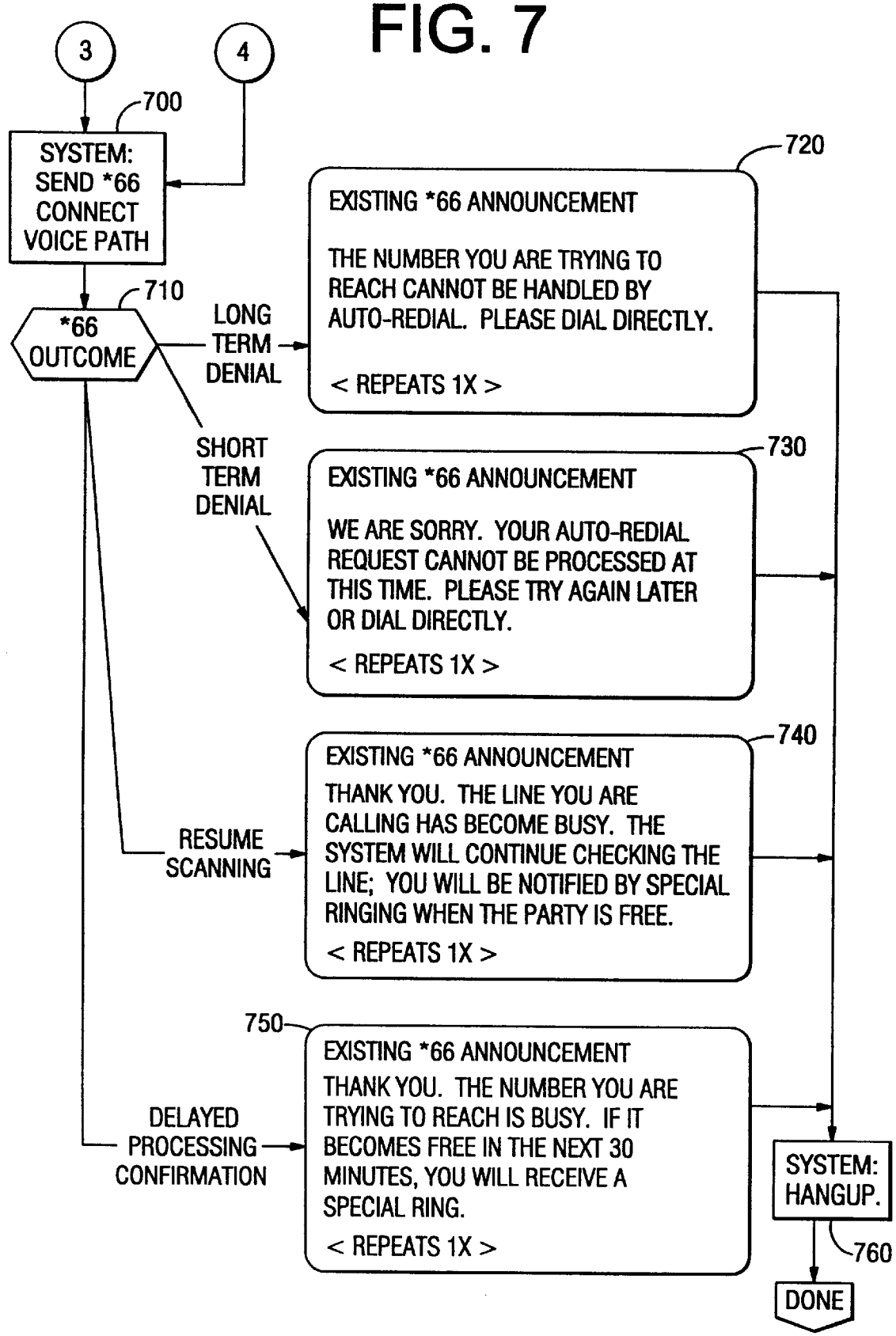

TTY ENHANCEMENT OF BUSY CONDITION PROMPT

FIELD OF THE INVENTION

The invention relates to a system and method for enhancing a busy signal prompt that helps allow text telephone users to understand a busy line condition.

BACKGROUND

Advances in telecommunications systems have provided more services to telecommunications users. For example, telecommunications device for the deaf (TDD) and text telephones (TTY), hereinafter both referred to as TTY devices, allow users to communicate with non-speech sound on a telephone network. Such users include those users who cannot hear and those who cannot speak. Another service, such as Prompted Automatic Callback (PAC), provides users with a voice message informing the user that the line they are calling is busy. For example, the PAC system may provide a message that states "the number you have dialed is busy." The PAC system may also ask the user if the user wishes to invoke an automatic call back feature to automatically call back the number when the line becomes available.

Prior to the development of automatic callback services, TTY users could recognize a busy signal by observing a determined pattern of flashes of a signal strength light of the TTY device that are produced by the busy signal. When a telecommunications provider provides an automatic callback service such as the PAC service, however, the busy signal is replaced with the announcement stating that the line is busy. Absent the busy signal, TTY users may no longer be able to recognize a busy line. The announcement produces intermittent flashes of the TTY signal strength light indicating that words are being spoken and does not produce the patterned flashes of the busy signal. The intermittent flashing light conveys no specific information to the user, thus the TTY user would be unaware that the line is busy.

Thus, there is a need for an improved communications system that can aid a TTY user in identifying a busy condition even when the communications system uses an announcement service such as the PAC service instead of the busy signal.

BRIEF DESCRIPTION OF THE DRAWINGS

FIG. 6 is a flow chart illustrating a routine for displaying a foreign language voice message according to a preferred embodiment.

FIG. 7 is a flow chart illustrating a routine for providing an automatic call back service according to a preferred embodiment.

DETAILED DESCRIPTION

A method and system provide an indication of a busy condition to a calling party on a telecommunications system. The calling party may be the user of a text telephone device such as a TTY device. One who cannot hear may be a typical user of the TTY device. Some telecommunication services send a voice message instead of a busy signal when the called party's line is busy. Often the user of the TTY device cannot hear the voice message. According to a preferred embodiment, when the called party's line is busy, the method and system send a text and voice message to the phone and/or TTY user that indicates that the called party's line is busy.

Figure 1:
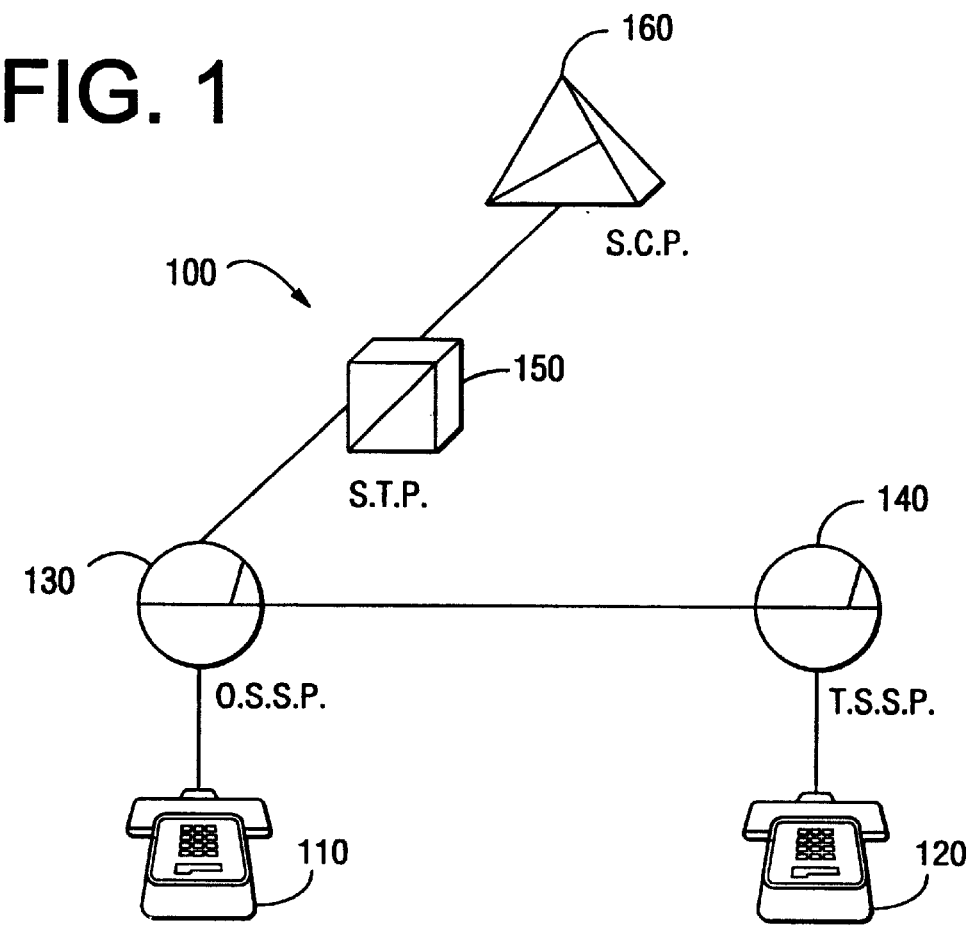
FIG. 1 is a block diagram illustrating a telecommunications system according to a preferred embodiment.
Figure 2:
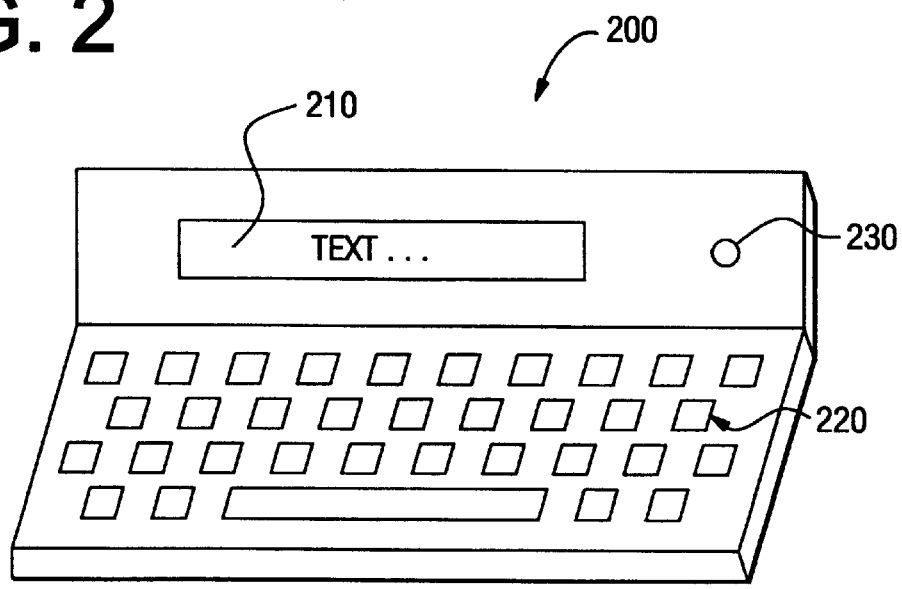
FIG. 2 illustrates a TTY according to a preferred embodiment.

FIG. 1 illustrates a busy signal identification system provided in a telecommunications system 100. The busy signal identification system can provide a visual busy signal to a system user, such as calling party 110. The calling party 110 may use a telecommunications device for the deaf (TDD) or a text telephone (TTY), hereinafter both referred to as TTY devices 200 (FIG. 2), to communicate to the called party 120. The TTY device 200 includes a text messaging screen 210 and keypad 220 to allow the calling party 110 to communicate on the telecommunications system 110 without the need to hear or produce speech. The keypad 220 can be used to write messages and the text messaging screen 210 can be used to view messages. The TTY device 200 may include a signal strength indicator light 230 that indicates the strength of an incoming signal. Those skilled in the art should appreciate that devices other than the TTY device can also be used, such as a computer with a specialized modem and software that accommodates TTY calls.

To accommodate a TTY or other call, the telecommunications system 100 includes an originating central office 130 connected with the calling party 110 and a terminating central office 140 connected with the called party 120. The originating central office 130 connects with the terminating central office 140 to connect the calling party 110 to the called party 120. Those skilled in the art will appreciate that in some cases the originating central office and the terminating central office may not be separate offices, but may be the same, single office. Also, the telecommunications system 100 may include other telecommunications equipment in the path between the originating office 130 and terminating office 140. The telecommunications system 100 may also include a signal transfer point 150 connected with the originating central office 130. The signal transfer point 150 connects with an integrated service control point 160 to send and receive signals to and from the service control point 160. The integrated service control point 160, among other things, helps to control telecommunication system services.

Figure 3:
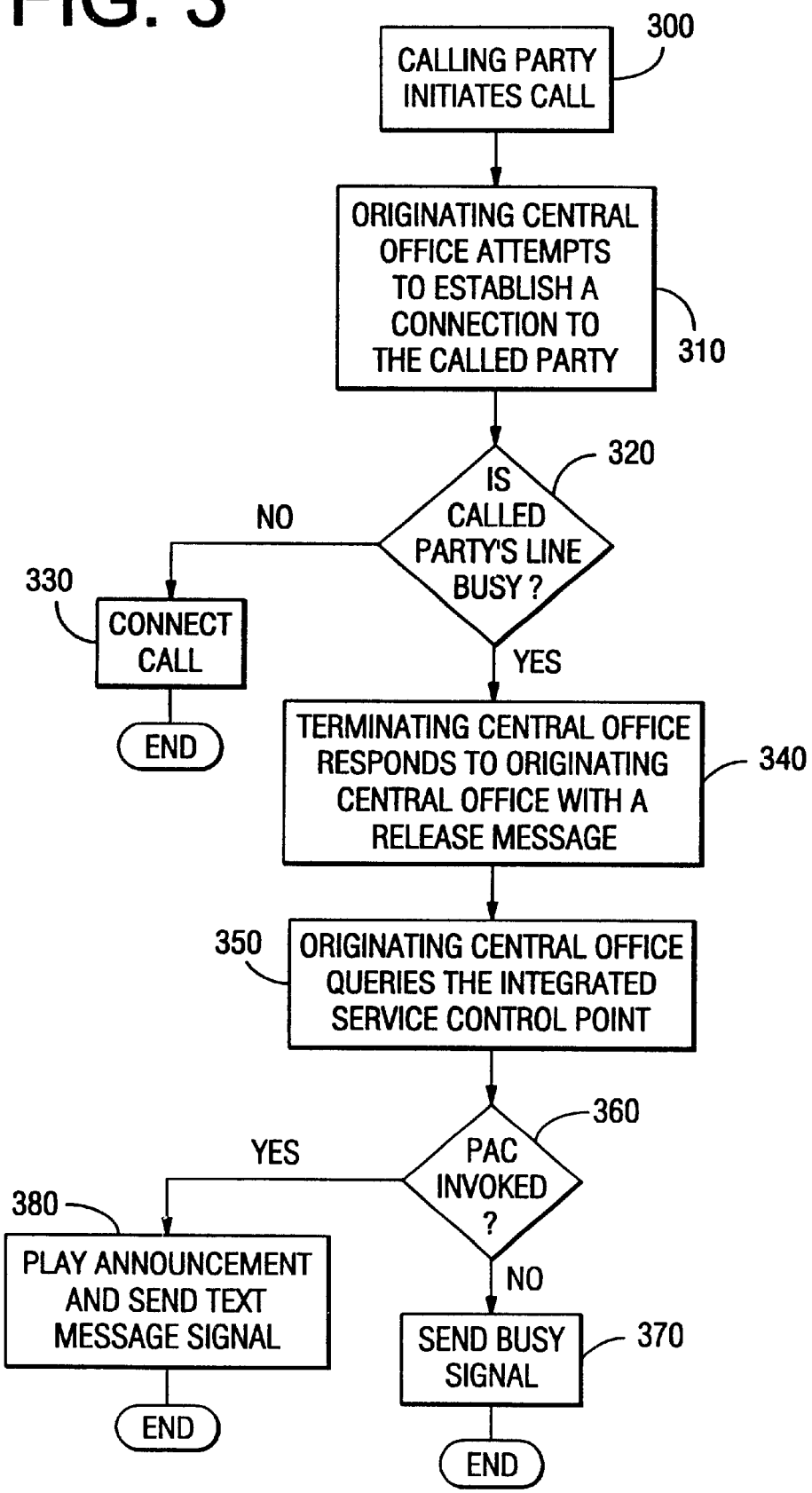
FIG. 3 is a block diagram illustrating an exemplary call flow that can occur with the telecommunications system of FIG. 1.

FIG. 3 is a block diagram illustrating an exemplary call flow that can occur within the telecommunications system 100. At block 300, the calling party 110 uses the TTY device 200 to dial the called party's phone number to initiate the call. At block 310, the originating central office 130 attempts to establish a connection to the called party 120 by sending a message to the terminating central office 140. The originating central office 130 and the terminating central office 140 may or may not be separate central offices. If the same office serves the calling party 110 and the called party 120, the messages would be internal to a serving office, for example the originating central office 130. At blocks 320 and 330, the call is placed if the called party's line is not busy. At block 340, if the called party's line is busy, for example, because a telephone of the called party 120 is off hook, the terminating central office 140 will respond to the originating central office 130 with a release message.

At block 350, in response to the release message the originating central office 130 queries the integrated service control point 160. At block 360, among other things, the integrated service control point 160 will determine whether a Prompted Auto Callback (PAC) system should be invoked. At block 370, if the PAC system is not invoked then the originating central office 130 may provide a standard busy signal to the calling party 110. At block 380, if the PAC system is invoked, the integrated service control point 160 may instruct the originating central office 130 to play an announcement to the calling party 110. The announcement may include a voice message such as "the number you have dialed is busy." The announcement may also include a text messaging signal for the TTY device 200 of the calling party 110. The text messaging signal prompts the text messaging screen 210 of the TTY device 200 to display the word "BUSY" or other such words or text to the calling party 110. The text messaging signal preferably includes a Baudot code (also known as ITA#2) signal or other signal such as proprietary ASCII codes implemented by TTY manufacturers.

Figure 4:
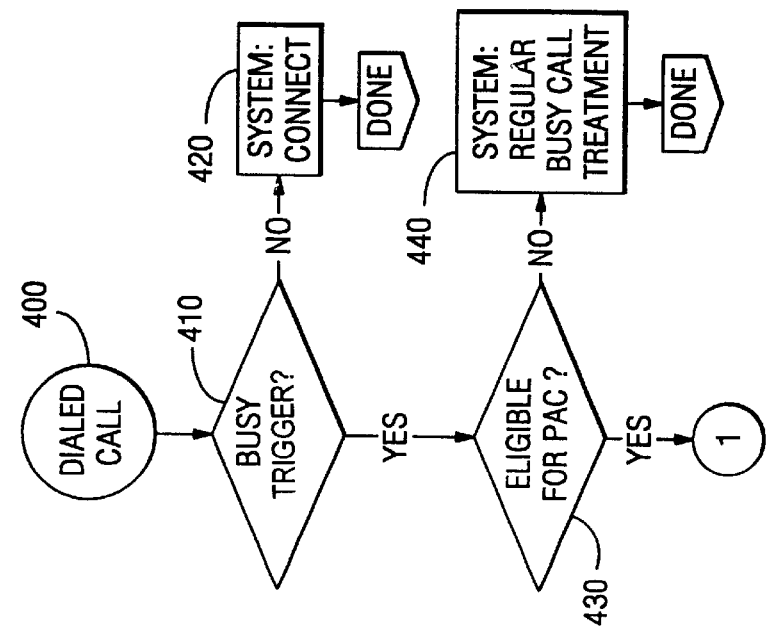
FIG. 4 is a flow chart illustrating a routine for handling an incoming call according to a preferred embodiment.

FIG. 4 is a flow chart illustrating an application to provide a visual busy signal to a TTY device user of a telecommunications system, such as the system described above. The application includes a computer program, for example, that is performed with software, hardware or firmware, or a combination thereof. The application can be stored on a computer usable medium having a computer readable code. The computer usable medium can include one or more mediums. The application can reside at, for example, the originating central office 130 or other part of the telecommunications system. At block 400, the calling party 110 dials the phone number of the called party 120.

At block 410, the application determines whether the originating central office 130 received a busy trigger such as a release message. The busy trigger can indicate that the line to the called party 120 is busy. At block 420, if a busy trigger was not received, the calling party 110 is connected to the called party 120, and a branch of the application ends.

At block 430, if the application determines that a busy trigger was received, the application determines whether the call is eligible for a Prompted Automatic Callback (PAC) service or other similar service. To evaluate if the call is eligible for the callback service may require determining whether the calling party 110 subscribes to the service. It may also be determined that the called party's line is a single, non-hunting line, for example, not a line that can be sent to different lines within a company depending on which one is available. It can also be determined that call forwarding, call waiting, call forwarding busy line, and call forwarding no answer services have been resolved before proceeding to the callback service. At block 440, if the call is not eligible for PAC, the calling party 110 may receive a regular busy signal, such as a known beeping tone.

Figure 5:
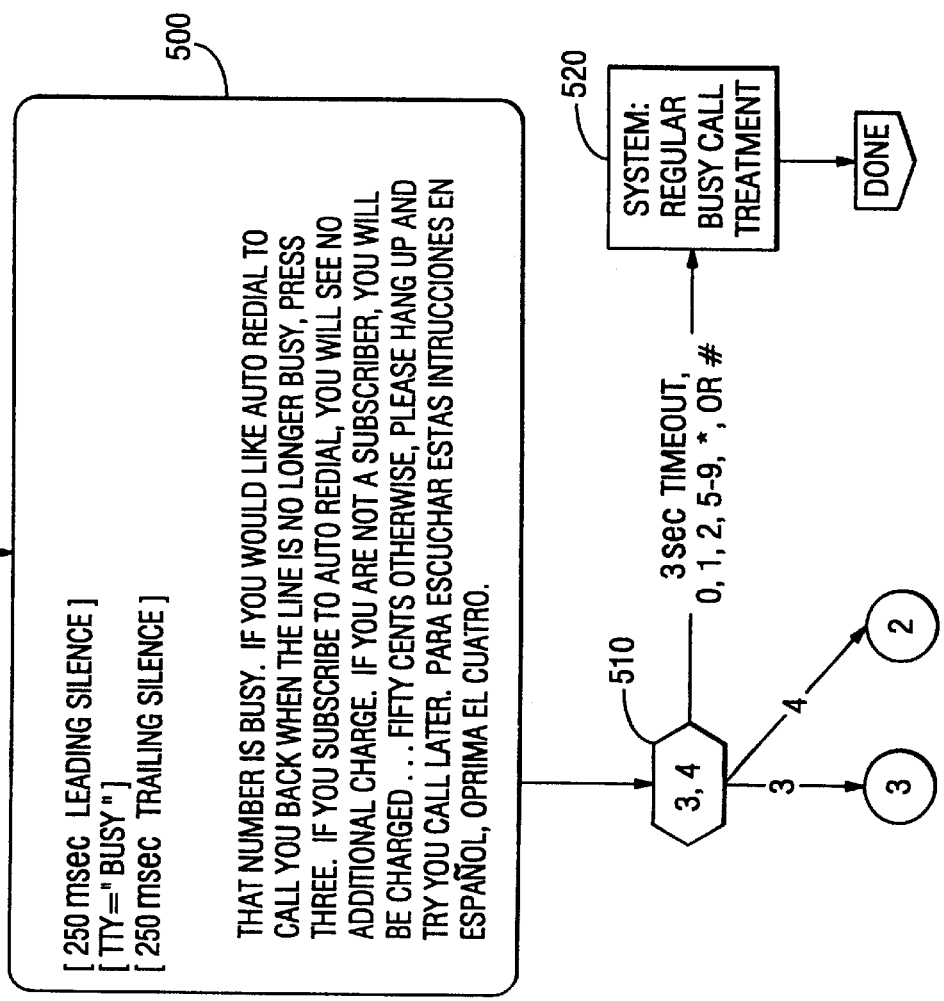
FIG. 5 is a flow chart illustrating a routine for handling a busy line condition according to a preferred embodiment.

FIG. 5 is a flow chart illustrating a routine for handling a busy line if the system is eligible for the callback service. At block 500, the application may begin a busy messaging sequence with a leading time period of silence, for example 250 milliseconds of silence. The leading time period of silence is optional but may be helpful for increasing the reliability of TTY message transmission and interpretation.

A text messaging signal is sent to the TTY device 200 of the calling party 110. The type of text messaging signal includes, for example, TTY tones or a Baudot code signal. The text messaging signal can be recorded or generated in real time. The text messaging signal can be sent before the voice message is sent, as shown at block 500. The text messaging signal can also be sent, however, at another time such as concurrent with the voice message, after the voice message or interposed between voice messages. The calling party 110 typically hears the text message as one or more tones. The signal prompts the text messaging screen 210 of the TTY device 200 to display the word "BUSY" or other such message to the calling party 110. In this manner, the TTY device user is notified that the line of the called party 120 is busy, and thus does not have to rely on the signal strength indicator light 230.

In a preferred embodiment, the TTY message is "_BUSY", where a space leads the word "BUSY." The leading space helps to ensure that the message displayed in the text messaging screen 210 is correct by allowing time for errant signals on the line to settle down since communication with the TTY device 200 typically does not include error checking. A trailing time period, for example 250 milliseconds, of silence can also be used after the text messaging signal is sent. The text "BUSY" can also be sent without a leading space, however, and other text can be used such as "BSY."

Thereafter, notification that the line is busy is sent to the calling party 110. The calling party 110 is sent a voice message to inform the calling party 110 that the line is busy. An exemplary voice message includes "the number you are calling is busy. If you would like Auto Redial to call you back when the line is no longer busy, press three. If you subscribe to Auto Redial, you will see no additional charge. If you are not a subscriber, you will be charged fifty cents. Otherwise, please hang up and try your call later. Para escuchar estas instrucciones en espanol, oprima el cuatro." Those skilled in the art will appreciate that other voice message words and phrases can be used and that the service offered may not be a redial service, or that an announcement may be provided without offering a service. Thus, the calling party 110 is requested to enter the touchtone digit "3", for example, to indicate an acceptance of the automatic callback service or a "4" to hear the instructions in a foreign language, such as Spanish. The digit entered by the calling party 110 is saved or a null character is saved if the digit collection period expires with no digits being entered.

At block 500, the voice message prompts the calling party 110 to enter the digit "3" on the keypad of the telephone or TTY device if the calling party 110 would like to invoke the automatic call back service. Moreover, the calling party 110 can enter the digit "4" is the calling party 110 would like instructions in a foreign language. At block 510, the application waits for a key press from the caller. At block 520, if a key other than "3" or "4" is depressed, such as 0, 1, 2, 4–9, *, or #, or no key is pressed within a timeout period, such as three seconds, then the call receives a typical busy call treatment and the routine ends. A typical busy call treatment includes playing the audible busy signal to the calling party 110. Alternatively, the routine can loop back to block 500 and replay the announcement until a determined key is pressed or the calling party 110 hangs up.

FIG. 6 is a flow chart illustrating a routine for displaying a foreign language voice message if the calling party 110 presses the "4" key. At block 600, a foreign language equivalent of the message described above is played asking the calling party 110 whether they would like to accept an automatic call back feature of the telecommunications system 100. At block 610, if the calling party 110 would like to accept the call back feature, the calling party is instructed to depress the "3" Key. At block 620, if a key other than "3" is depressed, or no key is pressed within a timeout period, such as three seconds, then the call receives a typical busy call treatment and the routine ends. Alternatively, the routine can loop back and replay the announcement at block 600 until a determined key is pressed or the calling party 110 hangs up.

FIG. 7 is a flow chart illustrating a routine for providing an automatic call back service if the calling party 110 accepts the call back service. At block 700, the application sends a code, such as "*66" to invoke the automatic redial function of the telecommunications system 100. The *66 keys are sent to the system that invokes the auto-redial service before the calling party 110 is connected so that the calling party 110 does not hear the *66 keys being pressed. By connecting the voice path, the calling party 110 is able to hear any announcements that the auto-redial system may play. Some systems may not allow sending the *66 keys prior to connecting the voice path.

At block 710, the code sent by the application can produce several outcomes. At block 720, if the number that the calling party 110 is trying to reach does not support the auto redial feature, the calling party 100 receives an announcement that explains that the number trying to be reached cannot be handled by auto redial. The calling party 110 is also informed that they can dial the number again at a later time to try to reach the called party 120. At block 730, if a short term problem exists on the automatic redial system, such as a communication link being down or the system being busy, the calling party 110 is informed that the automatic redial request cannot be processed at this time. At block 740, if the called party's line became free but is now busy again, the calling party 110 is informed that the line is again busy and the automatic redial system will system will continue checking the line. At block 750, typically after the calling party 110 requests the automatic redial service, an announcement will inform the calling party 110 that the number they are trying to reach is busy. Also, the calling party 110 will receive a special ring if the line becomes free within a determined time period, such as thirty minutes.

Thereafter, a call may be initiated by the originating central office 130 to the calling party 110, for example, using a unique ring pattern, when the called party's line is free. At block 760, the routine ends when the calling party 110 or the originating office 130 hangs up.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

I claim:

1. A method for providing an indication of a busy condition to a user on a communications system, wherein the communication system includes a called line and a service control point, the method comprising:

determining if the called line is busy;

if the called line is busy, querying the service control point to determine if a prompted auto callback is invoked;

if the prompted auto callback is invoked, sending a text message and a voice message to the user to indicate to the user that the called line is busy; and if the prompted auto callback is not invoked, sending a busy signal.

2. The method of claim 1 wherein sending the voice message occurs after sending the text message.

3. The method of claim 1 wherein sending the voice message occurs before sending the text message.

4. The method of claim 1 wherein sending the voice message occurs at the same time the text message is sent.

5. The method of claim 1 wherein the voice message is sent in response to a determined telecommunications service.

6. The method of claim 5 wherein the telecommunications service comprises a prompted automatic callback service.

7. The method of claim 1 wherein the text message is formatted for receipt by a TTY device.

8. The method of claim 7 wherein sending the text message comprises sending signals to be interpreted by the TTY device.

9. The method of claim 8 wherein the signals comprise Baudot code signals.

10. The method of claim 8 wherein the signals comprise ASCII code signals.

11. A busy signal identification system for providing an indication of a busy condition to a user on a communications system, wherein the communication system includes a called line and a service control point, the system comprising:

an application connectable with the communication system, wherein the application determines if the called line is busy;

wherein, if the called line is busy, the application queries the service control point to determine if a prompted auto callback is invoked; and wherein, if the prompted auto callback is invoked, the application sends a text message and a voice message to a the user to indicate to the user that a called line is busy, otherwise the application sends a busy signal.

12. The system of claim 11 wherein the voice message is sent after the text message is sent.

13. The system of claim 11 wherein the voice message is sent before the text message is sent.

14. The system of claim 11 wherein the voice message is sent at the same time the text message is sent.

15. The system of claim 11 wherein the voice message is sent to correspond to a determined telecommunications service.

16. The system of claim 15 wherein the telecommunications service comprises a prompted automatic callback service.

17. The system of claim 11 wherein the text message is sent to a TTY device.

18. The system of claim 17 wherein the text message is sent by sending signals to be interpreted by the TTY device.

19. The system of claim 18 wherein the signals comprise Baudot code signals.

20. The system of claim 18 wherein the signals comprise ASCII code signals.

* * * * *

UNITED STATES PATENT AND TRADEMARK OFFICE
CERTIFICATE OF CORRECTION

PATENT NO.   : 6,690,770 B2
DATED        : February 10, 2004
INVENTOR(S)  : Jeffrey L. Brandt It is certified that error appears in the above-identified patent and that said Letters Patent is hereby corrected as shown below:

Column 6,
Line 39, before "the user to" delete "a".

Signed and Sealed this

Twenty-second Day of February, 2005

JON W. DUDAS
*Director of the United States Patent and Trademark Office*